United States Patent [19]
Dawson

[11] 3,715,509
[45] Feb. 6, 1973

[54] METHOD AND MEANS FOR PROVIDING RESOLUTION LEVEL SELECTION IN A SPECTRUM ANALYZER

[75] Inventor: Edward C. Dawson, Saratoga, Calif.

[73] Assignee: The United States of America as represented by the Secretary of the Air Force

[22] Filed: Feb. 18, 1971

[21] Appl. No.: 116,337

[52] U.S. Cl. ......179/15.55 T, 343/5 DP, 179/15 AV, 340/347 AD, 324/77 B
[51] Int. Cl. .................................................H04b 1/66
[58] Field of Search ................324/97 B, 97 D–97 F; 343/14, 17.2, 17.5, 5 DP, 106 D; 325/320, 333, 345, 430, 431, 442, 11; 179/15.55 T, 1 SA, 15 AV; 340/347 AD

[56] References Cited

UNITED STATES PATENTS 3,278,907 10/1966 Barry et al.........................179/15.55
3,531,720 9/1970 Norsworthy.........................324/77 E
2,671,850 3/1954 Marcou.....................................325/11
3,490,049 1/1970 Choquet et al....................325/320 X
3,621,150 11/1971 Pappas...............................179/15.55

OTHER PUBLICATIONS

Westinghouse Engineer pg. 30–31 Vol. 29, No. 1 Jan. 1969

Primary Examiner—Charles D. Miller
Attorney—Harry A. Herbert, Jr. and Willard R. Matthews, Jr.

[57] ABSTRACT

Resolution level selection in a spectrum analyzer is provided by digitizing the IF analog input signal at a controllable rate, storing it in a digital memory device, and reading out the stored digital signal at an increased rate into a digital-to-analog converter. The resolution level is determined by the relationship between the digitizing rate and the memory read out rate.

1 Claim, 1 Drawing Figure

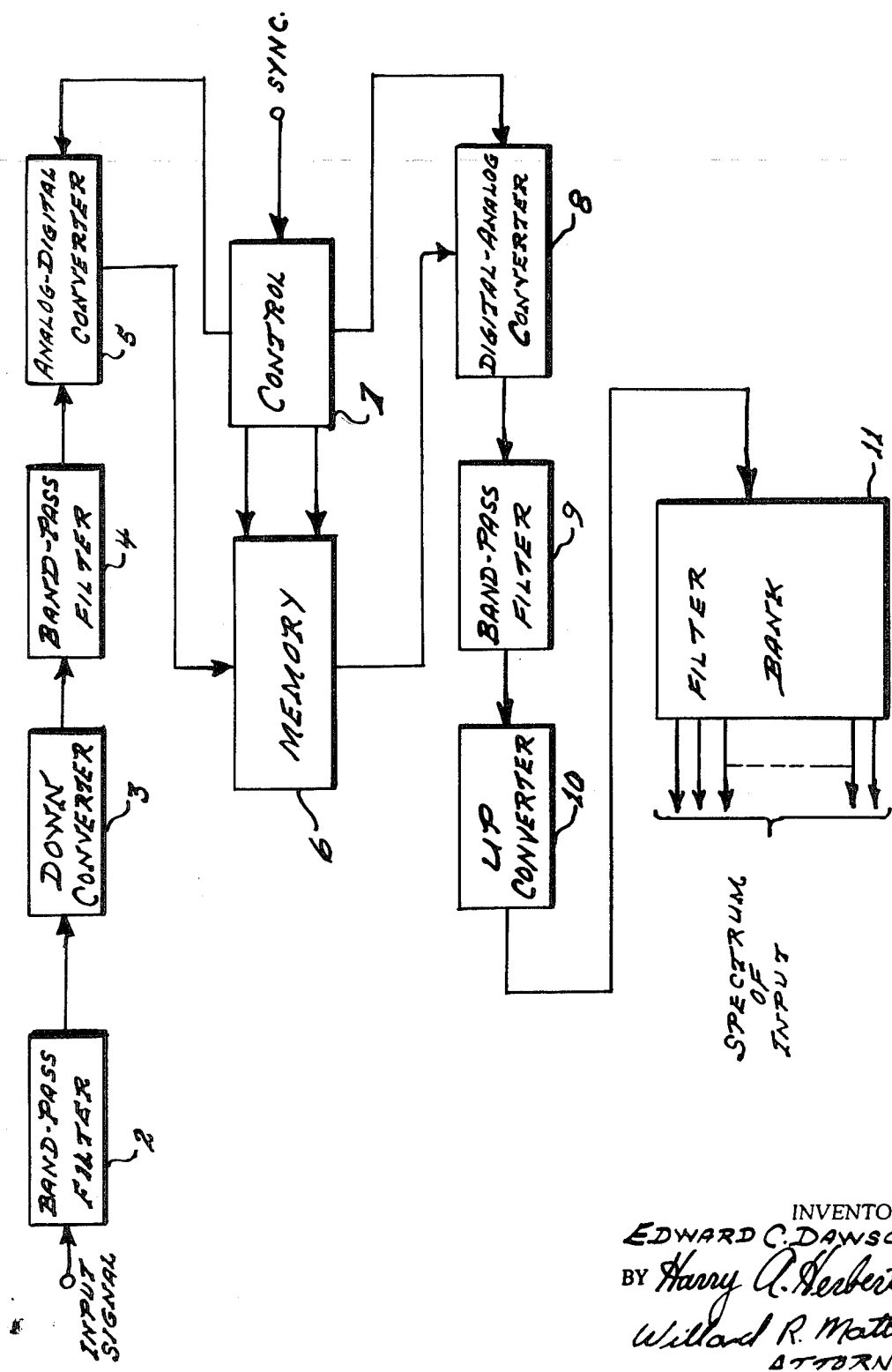

METHOD AND MEANS FOR PROVIDING RESOLUTION LEVEL SELECTION IN A SPECTRUM ANALYZER

BACKGROUND OF THE INVENTION

This invention relates to spectrum analyzers, and more particularly to the utilization of variable resolution filter banks in conjunction with such devices.

Existing spectrum analyzers which employ a bank of contiguously tuned filters, require a separate filter bank for each resolution level. If several or many levels of resolution are desired the analyzer becomes expensive and bulky. In addition, when the analyzer is required to process differing signal inputs in rapid sequence, the maximum switching rate is limited by both the rise and decay response times of the filters. The present invention is directed toward a method and means that enable more rapid processing by reducing these factors.

SUMMARY OF THE INVENTION

In essence the present invention comprehends means for digitizing and storing down converted samples of the IF analog input signal over a time period compatible with desired resolution (approximately 1.5/W where W is the desired resolution in Hz). The stored IF samples are subsequently read out of the memory device at a higher rate than the input rate. The speed-up process multiplies all frequency components of the original input waveform by the speed-up factor. Consequently there is an expansion of the spectrum of the IF sample by the speed-up factor, N. The expanded spectra signal feeds a filter bank. The filter bandwidth necessary to give the same resolution as a filter at the IF input is now wider by a factor N. Changes in effective resolution are accomplished by changes in the speed-up factor. The speed-up factor is controlled by changes in input sampling rates and memory read out rates.

It is a principal object of the invention to provide new and improved method and means for achieving resolution level selection in a spectrum analyzer.

It is another object of the invention to provide a spectrum analyzer having many levels of resolution that is less expensive and less bulky than currently available devices.

It is another object of the invention to provide a new and improved means for obtaining a variable resolution spectrum analyzer.

It is another object of the invention to provide means for reducing the inter-sample dead time associated with filter decay in a spectrum analyzer.

These, together with other objects, features and advantages of the invention will become more readily apparent from the following detailed description when taken in conjunction with the accompanying drawing.

DESCRIPTION OF THE DRAWING

The sole FIGURE of the drawing is a block diagram which illustrates the presently preferred embodiment of the circuit for varying resolution levels in a spectrum analyzer comprehended by the invention.

DETAILED DESCRIPTION OF THE PREFERRED EMBODIMENT

The invention is herein described in terms of an application wherein a spectrum analyzer is configured for the analysis of communication signals received by a radio receiver. In this application the signal input is from the IF amplifier of the receiver. However, the invention is also applicable to the analysis of signals at base band frequencies.

Referring now to the sole FIGURE of the drawing, analog-to-digital converter 5 is provided to digitize the input signal and store it in digital memory device 6. The input signal is first filtered, down converted in frequency and filtered again by band pass filter 2, down converter 3, and band pass filter 4. Analog-to-digital converter 5 is capable of providing digital outputs at any of various rates. The output of memory device 6 is read out in response to control means 7, converted to an analog signal by digital-to-analog converter 8, filtered by band pass filter 9 and up-converted in frequency by up converter 10 prior to being fed to filter bank 11. Control means 10 controls the rate at which analog-to-digital converter 5 operates and also controls the read out rate of memory device 6. System synchronization is provided in a conventional manner by synchronizing circuits not shown.

The above described block diagram and representative parameter values will now be used to better illustrate the technique of the invention. For a 100 Hz filter resolution, the incoming IF is down converted to a 6 KHz center frequency by down converter 3. For the present example, a minimum bandwidth of 1.5 KHz corresponds to the total band covered by a bank of 15 contiguous 100 Hz filters. The down converted signal feeds analog-to-digital converter 5. An analog-to-digital sample rate of 25 KHz is used for the 100 Hz resolution example. A sampling duration of 15 msec (= 1.5/W) results in storing 375 digital words in memory bank 6. The memory bank read out which feeds digital-to-analog converter 8 is carried out at a 500 KHz rate. The result, after passing through band pass filter 9, is a reproduction of the original input waveform with a speed-up factor of 20. Accordingly, all frequency components are multiplied in frequency by a factor of 20. The frequency separation between any two input waveform components is likewise multiplied by the same factor.

The new center frequency is 120 KHz which corresponds to the chosen center frequency of the filter bank. The bandwidth of the filters in this filter bank is 2 KHz. The combined bank bandwidth for the 15 filters is 30 KHz. With the parameters given the result of the configuration is a resolution equivalent to that for a 100 Hz filter bank.

Further, by way of example, a 300 Hz filter resolution capability is achieved if the proposed down converted frequency is 18 KHz with a bandwidth of not less than 4.5 KHz. The sample period is 5 msec. (= 1.5/W) and the sample rate is 75 KHz. As before, during the sample period 375 words are stored. The memory read out rate also remains unchanged at 500 KHz giving a speed-up factor of 20/3 The base center frequency of the output waveform is 120 KHz corresponding to the filter bank center frequency. The separation of the frequency components of the original IF waveform is increased by 20/3 and thus the resolution achieved by the 2 KHz bandwidth filters on the speeded up waveform is equivalent to that of 300 Hz filters on the non-speeded up waveform.

800 Hz resolution can be obtained with a down converted IF frequency of 48 KHz, a sample duration of 1.875 msec and an A/D sample rate of 200 KHz. Other parameters remain as before, the sample rate to the D/A converter being 500 KHz.

The minimum IF sample period is determined by the desired resolution and is not influenced by the choice of bandwidth of filters in the filter bank. On the other hand, the time lapse which must be allowed for filter "discharge" before the filter can be used on another sample is determined by the filter bandwidth. If the bandwidth chosen is appreciably higher than the widest desired resolution, filter discharge will be completed during the sampling period for the next sample. This effectively doubles the processing rate.

While the invention has been described in its preferred embodiment, it is understood that the words which have been used are words of description rather than words of limitation and that changes within the purview of the appended claims may be made without departing from the scope and spirit of the invention in its broader aspects.

I claim:

1. A circuit for varying resolution levels comprising,
an analog-to-digital converter adapted to digitize at various rates an analog input signal,
a digital memory device adapted to store signals digitized by said analog-to-digital converter,
a digital-to-analog converter adapted to convert the output of said digital memory device into an analog output signal, and
control means adapted to effect analog-to-digital converter digitization at discrete intervals and at a given rate and memory device read out at a substantially higher rate than said analog-to-digital converter digitization rate,
means for down converting in frequency said analog input signal,
a band pass filter connected between said
means for down converting and said analog to digital converter,
means for up converting in frequency said analog output signal,
a second band pass filter connected between the output of said digital to analog converter and said means for up converting,
a spectrum analyzer connected to the output of said means for up converting.

* * * * *